E. W. PRITCHARD.
POT LIFTER, LID, AND DRAINER.
APPLICATION FILED FEB. 25, 1916.
1,209,026.
Patented Dec. 19, 1916.
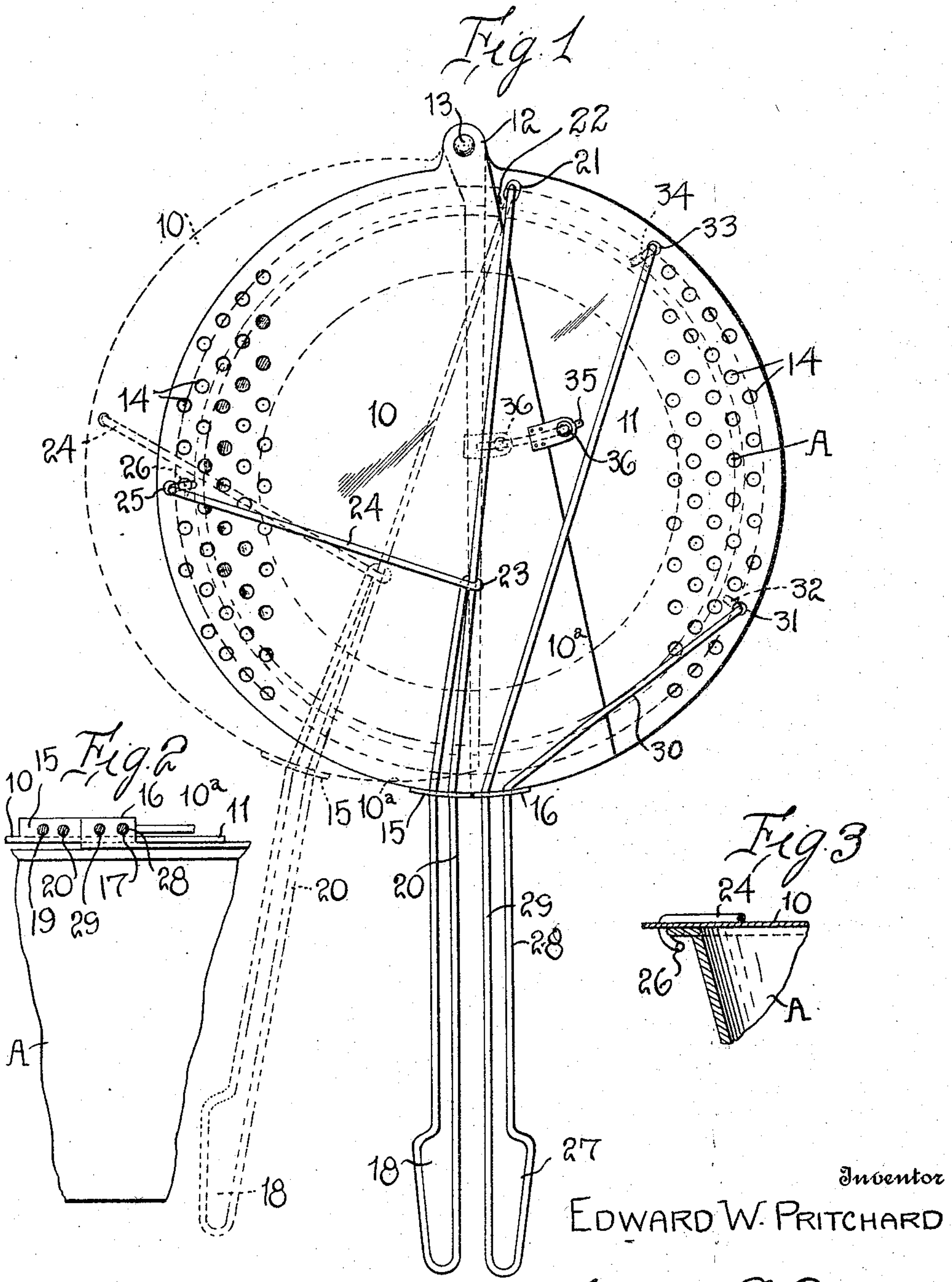
Inventor
EDWARD W. PRITCHARD
By Watson E. Coleman
Attorney
THE NORRIS PETERS CO., PHOTO-LITHO., WASHINGTON, D. C.

UNITED STATES PATENT OFFICE.

EDWARD W. PRITCHARD, OF CAMBRIA, WISCONSIN.

POT LIFTER, LID, AND DRAINER.

1,209,026. Specification of Letters Patent. Patented Dec. 19, 1916.

Application filed February 25, 1916. Serial No. 80,465.

*To all whom it may concern:*

Be it known that I, Edward W. Pritchard, a citizen of the United States, residing at Cambria, in the county of Columbia and State of Wisconsin, have invented certain new and useful Improvements in Pot Lifters, Lids, and Drainers, of which the following is a specification, reference being had to the accompanying drawings.

This invention has for its object to provide an improved implement which forms not only a lid for a pot but also means whereby a pot may be lifted and drained.

A further object of the invention is to provide a device of this character which may be applied to pots of different sizes and which will close pots of different sizes.

Still another object is to improve upon the construction of devices of this character by providing reinforcing and supporting members which bear the weight of the pot when the device is in operation.

My invention is illustrated in the accompanying drawings, wherein:

Figure 1 is a top plan view of my improved implement; Fig. 2 is a fragmentary elevation showing it applied to a pot A and the wires or rods forming the handle being in section; and Fig. 3 is a fragmentary sectional view of the pot A and of my implement applied thereto.

Referring to these figures, the device comprises two segmental sections 10 and 11, one of these sections, the section 11, being approximately semi-circular in form. The other section 10 is more than semi-circular, and its inner edge extends at an angle to a line intersecting the axis upon which the periphery of the section 10 is described. The sections 10 and 11 are provided with ears 12 which are operatively pivoted to each other as by a rivet or bolt 13. Each of the sections 10 and 11 is provided at its curved margin with a plurality of drain openings 14 and each section at its edge opposite the pivotal connection of the sections is formed with an upturned flange, these flanges being respectively designated 15 and 16. Each flange is formed with a pair of perforations 17.

The sections 10 and 11 are provided each with a handle. The handle of the section 10 is formed of a relatively large and strong wire or rod which is bent upon itself to form a loop 18. One leg 19 of this loop passes through one of the perforations 17 of the flange 15, while the other leg 20 passes through the other of these perforations and extends toward the pivotal point of the sections and extends downward through an opening 21 and is then rebent upon itself to form a hook 22 adapted to engage underneath the flange of a pot. The leg 19 extends through the opening 17 of the flange 15 and is formed into a loop 23 which embraces the leg 20 and is then extended at right angles, as at 24, to the edge of the section 10 and is there passed through an opening 25 and re-bent upon itself to form a hook 26 which, like the hook 22, is adapted to engage beneath the flange of a pot. The handle for the section 11 is also formed of a piece of heavy wire or rod of sufficient strength, is bent upon itself to form the loop 27, the legs 28 and 29 passing through the openings 17 of the flange 16. The leg 28 is then angularly bent, as at 30, and extended to the edge of the section 11, passes downward through an opening 31 and is then re-bent upon itself to form a hook 32. The leg 29 is passed through the opening 17 on flange 16, and extends across the section 11 to the upper margin thereof and is there passed through an opening 33 and bent to form a hook 34. These hooks 22, 26, 32 and 34 are all adapted to engage beneath the flange on the pot, as illustrated in Fig. 3, so that when the implement is disposed over a pot, by closing it the hooks will be brought in engagement with the flange and the pot may be raised or otherwise manipulated. As shown clearly in Fig. 1, the portion $10^a$ of the section 10 overlaps the section 11 when the handles are closed, and even overlaps the section 11 when the handles are open to a considerable degree. The outward movement of the sections 10 and 11 away from each other is limited by means of a slot 35 formed in one section and a pin 36 carried by the other section which operates within this slot.

The practical use of my invention will be obvious. When it is desired to apply it to a pot the handles are disposed in divergent relation, the sections 10 and 11 are placed upon the pot and then the handles closed. Under these circumstances the several hooks will engage with the flange of the pot and hold the sections 10 and 11 upon the pot so as to form a cover or lid therefor. When it is desired to drain the pot, the pot may be lifted by means of the handles and then turned so that the contents of the pot may be drained out through the drainage openings 14. The device, it is obvious, may be applied to pots of various diameters, and the device has a relatively large range. It is particularly pointed out that because of the portion $10^a$ of the section 10 overlapping the portion 11 the device may be applied to pots of different diameters without there being any space between the sections through which the vapors issuing from the pot can pass. It is also pointed out that there are only three hooks, these movable hooks being disposed approximately equi-distant around the periphery of the circle formed by the sections 10 and 11 and that the hook 22, is relatively speaking, fixed, that is, that it is disposed so close to the pivot 13 that its movement is very slight. Thus the hook 22 is engaged with the flange of the pot and then the hooks 34, 32 and 26 are brought into engagement with the pot. This construction permits the device to be applied to pots of various diameters, the hooks 32 and 26, which are disposed in opposed relation to each other, being movable toward or from each other. It will be seen, of course, that the sections are segmental in form, one of the sections being semi-circular and the other section having a larger area than that inclosed by a semi-circle. It will be seen that this pot lid and lifter is capable of use with different size pots without each time adjusting the sections of the lifter but that this adjustment is made by simply closing the device upon the pot. Furthermore, it will be seen that the portions 24, 20, 29 and 36 extend transversely across the faces of the sections 10 and 11 and that these portions are engaged with the margins of the sections at a plurality of points so that the lifter is fully braced and is relatively strong and so that a turning movement given to the handles 18 and 27 will be transmitted directly to the sections 10 and 11 and proportionate strain on the wire handles will be very greatly reduced.

It is obvious that many minor changes might be made without departing from the spirit of the invention in order to fit the device to various forms of vessels to which it might be applied.

Having described the invention, what I claim is:

1. A pot lifter, lid and drainer comprising segmental perforated sections pivoted to each other for movement in parallel planes, one of the sections being semi-circular in form and the other being greater than a semi-circle whereby the last-named section may overlap the first-named section, handles connected one to each section opposite the pivotal connection thereof, and hooks carried by the sections and adapted to engage beneath the flange of a pot.

2. A pot lifter, lid and drainer comprising segmental sections pivoted to each other for movement in parallel planes, the opposite ends of the sections being perforated, one of the sections being semi-circular and the other having an area greater than a semi-circle whereby it may overlap the first-named section, handles attached to each section, each handle comprising a rod formed at one end to provide a hook extending through the section adjacent the edge thereof, extending across the section and operatively connected thereto, extending outward to form a handle and then in parallel relation and again engaged with the section and then extended laterally across the section and engage with the section adjacent its edge and formed to provide a hook.

3. A pot lifter, lid and drainer comprising segmental sections pivoted to each other for movement in parallel planes, the sections being perforated at opposite ends, one of said sections being approximately semi-circular in form and the other having an area greater than that of a semi-circle so as to overlap the other section, one of said sections being formed with a slot and the other with a sliding member engaging said slot, and handles operatively connected to the upper faces of the sections, said handles having extensions extending across the faces of the sections and terminating in downwardly projecting hooks disposed upon the under faces of the sections.

In testimony whereof I hereunto affix my signature in the presence of two witnesses.

EDWARD W. PRITCHARD.

Witnesses:
O. I. JONES,
W. G. JONES.

Copies of this patent may be obtained for five cents each, by addressing the "Commissioner of Patents, Washington, D. C."